Sept. 26, 1950    R. P. RANDALL    2,523,778
GROUNDING TRANSFORMER AND PROTECTIVE
SYSTEM THEREFOR
Filed Feb. 23, 1949
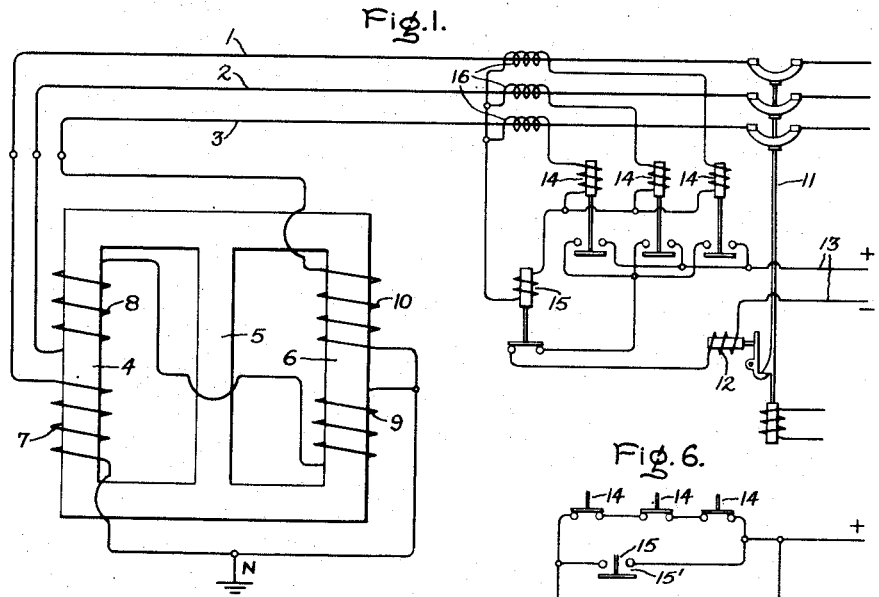
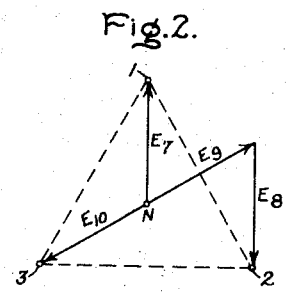
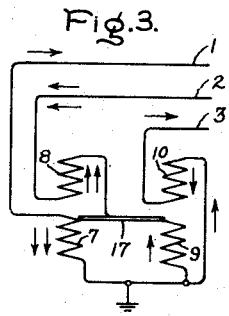
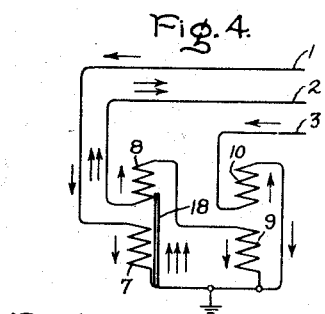
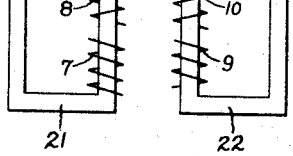
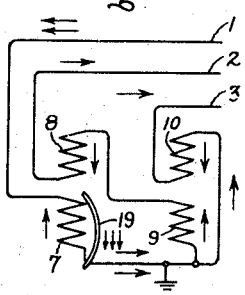
Inventor:
Robert P. Randall,
by Ernest C. Britton
His Attorney.

Patented Sept. 26, 1950

2,523,778

UNITED STATES PATENT OFFICE 2,523,778

GROUNDING TRANSFORMER AND PROTECTIVE SYSTEM THEREFOR

Robert P. Randall, East Orange, N. J., assignor to General Electric Company, a corporation of New York Application February 23, 1949, Serial No. 77,748

3 Claims. (Cl. 175—294)

1

This invention relates to stationary induction apparatus and more particularly to improvements in so-called grounding transformers and to the protection thereof from internal faults.

When, as is often the case, a polyphase power circuit does not have a well grounded neutral, as, for example, when the transformer or other windings connected to it are delta connected or are star connected with the neutral ungrounded, ground faults on one of the phases of the circuit cause objectionable over-voltages on the other phases but do not cause appreciable fault currents to flow. It is, therefore, conventional practice to connect a so-called grounding transformer or reactor to such a circuit to provide a source of zero sequence current to facilitate in the detection and removal of ground faults by means of protective relays. The conventional grounding transformer consists of a three phase core with a so-called zig-zag connected winding on it. Such a winding has two equal coils on each core leg, which coils are interleaved or otherwise closely coupled. Each electrical phase of the winding consists of two serially connected coils on different legs with the connections symmetrical and the two serially connected coils for each phase reversed in polarity. In this manner the zig-zag winding has a relatively high positive sequence reactance and has a practically zero reactance to zero sequence currents, the reactance in the latter case being merely the leakage reactance of the individual coils which is very low due to their close coupling.

I have discovered, however, that zig-zag connected grounding transformers produce practically no fault currents in response to an internal fault in them, and that, therefore, the problem of detecting internal faults with relays is difficult. Thus, for example, if one of the six coils of a zig-zag winding should become short-circuited there can be no appreciable change in the phase currents of the grounding transformer because of the close coupling between its various coils and except for slight changes in magnetizing current there is no reliable increase in current which can be made to operate an over-current relay.

I have solved the above problem by devising a new transformer which is especially suitable for use as a grounding transformer and which not only will cause substantial fault currents to flow in response to any internal fault therein, but is also substantially simpler than a conventional zig-zag connected grounding transformer in that it only has four coils instead of six coils.

2

An object of the invention is to provide a new and improved stationary induction apparatus.

Another object of the invention is to provide a new and improved grounding transformer or reactor.

A further object of the invention is to provide a polyphase neutral grounding device which will cause substantial fault currents to flow in response to an internal fault therein and in which the over-currents due to an internal fault may be distinguished from those due to external ground faults and relayed accordingly.

An additional object of the invention is to provide a new and improved protective system for grounding transformers.

The invention will be better understood from the following description taken in connection with the accompanying drawing and its scope will be pointed out in the appended claims.

In the drawing Fig. 1 is a diagrammatic illustration of a three phase system embodying a preferred form of the invention, Fig. 2 is a vector diagram of the voltages in my improved grounding transformer, Figs. 3, 4 and 5 illustrate how fault currents will flow as a result of various different kinds of internal faults in my grounding transformer, Fig. 6 illustrates a modified connection of the contacts of a protective relay system, and Fig. 7 is a modification of the grounding transformer in which separate single phase cores are used.

Referring now to the drawing and more particularly to Fig. 1, there is shown therein a three phase circuit having separate phase conductors 1, 2 and 3. Connected to this circuit is my improved grounding transformer which is shown by way of example as comprising a unitary core type three legged three phase core, individual legs being designated as 4, 5 and 6. Mounted on the leg 4 are coils 7 and 8 and mounted on the leg 6 are coils 9 and 10. All four coils have an equal number of turns and in practice they will be interlinked or otherwise closely coupled so as to have minimum leakage reactance. However for the sake of clarity of illustration they have been shown separate. The coil 7 is connected directly between a common grounded neutral and phase conductor 1, likewise the coil 10 is connected between ground and the phase conductor 3. The coils 8 and 9 are serially connected between ground and the phase conductor 2.

For isolating the transformer in the event of internal faults, there is a circuit breaker 11 provided with a trip coil 12 which is energized from a suitable supply circuit 13 under the control of separate overcurrent relays 14 for each of the three phases of the transformer in combination with a relay 15 which responds to so-called zero sequence or ground fault currents. These relays are energized by means of individual current transformers 16 connected in each of the phase conductors of the transformer.

The two coils 7 and 8 on the leg 4 and the two coils 9 and 10 on the leg 6 are reversely connected with respect to zero sequence or ground fault currents. In other words, if the currents in all of the coils are in phase with each other, which is the characteristic of zero sequence current, then the magnetomotive forces of coils 7 and 8 will neutralize each other, and likewise the magnetomotive forces of coils 9 and 10 will neutralize each other. The impedance of the transformer to zero sequence currents will thus be determined by the leakage reactance of the transformer and will be small.

Considering now the case when a balanced three phase system of voltages is applied to the terminals of the transformer, coils 7 and 10, being directly connected between ground and the respective phase conductors 1 and 3 of the circuit, will determine the magnitude and phase angle of the fluxes in the legs 4 and 6 and the leg 5 will act as a return path for the fluxes in the two legs 4 and 6. Although it is not essential, it is preferable that the coils 7 and 10 be so connected that the voltages and the fluxes they produce are 120 degrees out of phase, although this is not essential and one of them can be reversed so that their voltages and fluxes are 60 degrees out of phase. The reason the former arrangement is preferred is that it produces minimum flux in the return leg 5, the flux in that case being the same in magnitude as in the other two legs. If, however, the polarities or connections of coil 10 are reversed then coil 9 should similarly be reversed as will be more apparent from the vector diagram shown in Fig. 2.

Referring now to Fig. 2, the voltage of the coil 7 is represented by the vector $E_7$ and, as shown, this extends vertically upward from the neutral point N to the point 1 representing the voltage of the phase conductor 1; similarly the vector $E_{10}$ represents the voltage of the coil 10 and extends from the neutral and other point 3 representing the phase conductor 3. It will be observed that these voltages are 120 degrees out of phase like the leg voltages of a three phase star connected winding, and it will be observed that the actual connections and polarities of the windings 7 and 10 in Fig. 1 correspond to such a connection. The voltage between the neutral point N and point 2 representing the phase conductor 2 consists of the resultant of the vectors $E_9$ and $E_8$ representing respectively the voltages of the coils 9 and 8. It will be noted that $E_9$ is shown in phase opposition to $E_{10}$, this being the result of the fact that connections of winding 10 are reversed relative to winding 9 and, likewise, the connections of winding 8 are reversed relative to winding 7 so that $E_8$ is 120 degrees out of phase with $E_7$ so far as the circuit voltages are concerned. Therefore, the three phase voltages of the grounding transformer are symmetrical and balanced. Thus to positive or negative sequence voltages the transformer acts as a high impedance and draws only magnetizing current.

Fig. 3 shows an internal fault in the form of a phase to phase short circuit between phases 1 and 2 and the small arrows represent the fault currents and their distribution as a result of such a fault. Fig. 4 illustrates a phase to ground fault 18 inside the grounding transformer between ground and phase 2, and the small arrows indicate the distribution of the fault currents resulting therefrom. Fig. 5 illustrates a turn to turn fault 19 in the form of a short circuit of the coil 7, and the small arrows indicate how the fault currents will flow in that case.

It will be observed that not only do fault currents flow in each of the three phases in Figs. 3, 4 and 5 but that those fault currents contain no zero sequence component. At least one of the over-current relays 14 is sure to pick up and close its contacts as a result of an internal fault in the grounding transformer, and as the contacts of the relays 14 are in parallel, the operation of any one of them will cause the trip coil 12 to open the circuit breaker 11 unless the relay 15 has operated. The purpose of the relay 15 is to prevent tripping of the circuit breaker in case there is a ground fault on a system which will cause heavy zero sequence currents to flow. Such zero sequence current will appear in the residual connection of the current transformer 16 and thus will flow in the coil of the relay 15 which will then open its contacts and prevent false or improper tripping of the circuit breaker.

In the modification shown in Fig. 6, the contacts of the relays 14 are normally closed and they are connected in series with each other and in parallel with a normally open set of contacts 15' for the relay 15. These contacts are in series with an auxiliary relay 20 having a normally closed pair of contacts in the circuit for the trip coil 12. In this manner the auxiliary relay will ordinarily be picked up through the closed contacts of the relay 14 an the tripping coil 12 will be deenergized. If there is no ground fault on the system, the contacts 15' will remain open, and therefore if there is an over-current in one or more of the phases due to internal fault in the grounding transformer, the contacts of the relays 14 open and will thus deenergize the relay 17 and energize the trip coil 12. If, however, the over-current is a balanced zero sequence current resulting from a current fault then the contacts 15' of the relay 15 will close and thus will hold the relay 17 energized so that the trip coil can not be energized by the contacts of the relays 14.

In the modification shown in Fig. 7, two single phase cores 18 and 19 are used instead of a single three phase core. However, it will be observed that the coils 7 and 8 are on one winding leg of the core 18 which, of course, has its own flux return path, while the coils 9 and 10 are on a winding leg of the coils 19 which also has its own flux return path so that the flux return paths for the two sets of coils do not depend upon the winding leg of the other set.

While there have been shown and described particular embodiments of this invention it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A grounding transformer for three phase circuits comprising, in combination, a total of four similar windings, and a magnetic core means having a total of two winding legs each of which has a flux return path which excludes the other leg, two of said windings being mounted on each of said legs and being closely coupled by interwinding so as to have minimum leakage reactance, three of said windings having one terminal each directly inter-connected to form a common neutral, means for solidly grounding said neutral, the remaining winding being connected in series with one of the other three windings, the remaining three free terminals of said windings being for connection to the separate phase conductors of a three phase circuit, the magnetomotive forces of the two windings on each leg which will result from symmetrical zero phase sequence currents flowing in said windings being opposed whereby only the leakage reactances of said windings limit the flow of such zero sequence currents.

2. The combination with a grounding transformer as defined in claim 1, of a three phase circuit breaker serially connected therewith, a trip coil for said circuit breaker, a separate over-current relay for each phase of said transformer, means including three Y connected current transformers serially connected respectively in the phases of said transformer for energizing each relay in accordance with the current in a different phase of said transformer, a zero sequence relay connected in the neutral return connection of said current transformers, and connections between said relays and said trip coil for causing energization of said trip coil only when said zero sequence relay is deactuated at a time when any one of said over-current relays is actuated.

3. A grounding transformer for three phase circuits comprising, in combination, a total of four similar windings, and a unitary magnetic core having a total of two winding legs and a common flux return leg between the two winding legs, two of said windings being mounted on each of said legs and being closely coupled by interwinding so as to have a minimum leakage reactance, three of said windings having one end each directly interconnected to form a common neutral, means for solidly grounding said neutral, the remaining winding being connected in series with one of the other three windings, the remaining three free ends of said windings being for connection to the separate phase conductors of a three phase circuit, the magnetomotive forces of the two windings on each leg which will result from zero sequence currents flowing in said windings being opposed whereby only the leakage reactances of said windings limit the flow of such zero sequence currents.

ROBERT P. RANDALL.

REFERENCES CITED

The following references are of record in the file of this patent:

UNITED STATES PATENTS

| Number | Name | Date |
| --- | --- | --- |
| 1,894,827 | Mallett | Jan. 17, 1933 |
| 2,295,398 | Griscom | Sept. 8, 1942 |